March 6, 1956     T. W. BAILEY     2,737,396
CHUCK ASSEMBLY
Filed Dec. 22, 1952
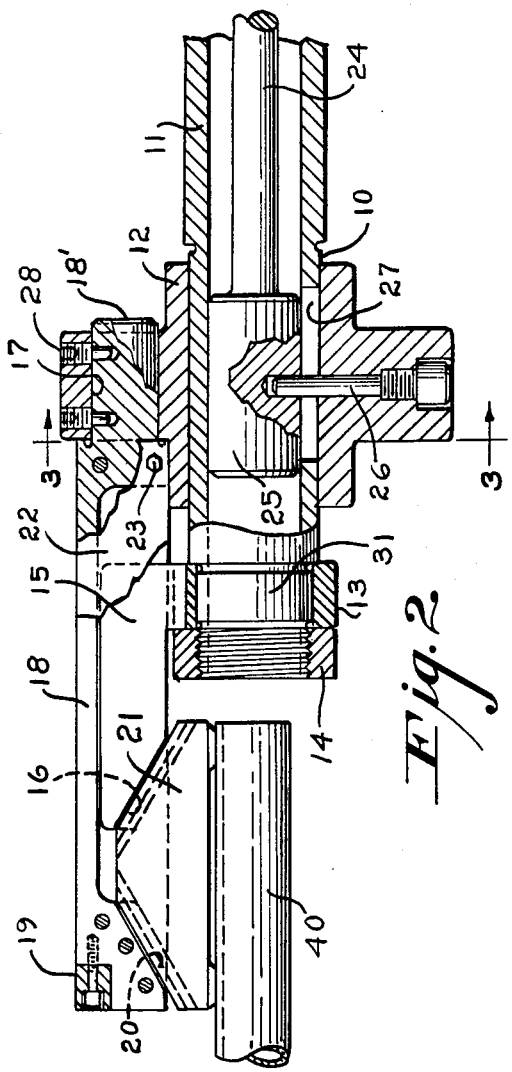
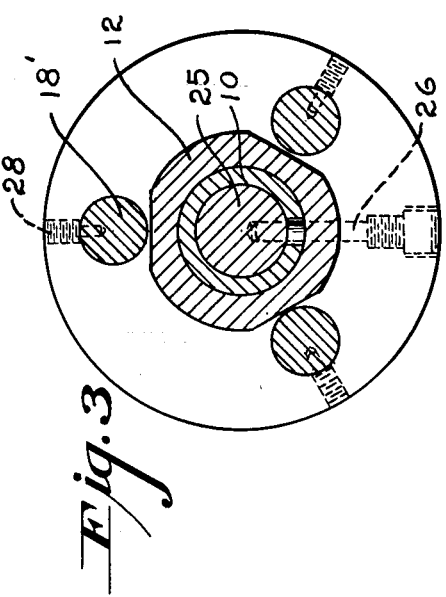
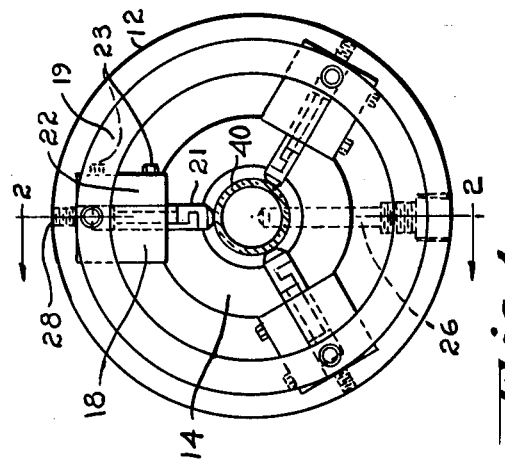
INVENTOR.
THOMAS W. BAILEY
BY
ATTORNEY.

United States Patent Office 2,737,396
Patented Mar. 6, 1956

2,737,396
CHUCK ASSEMBLY

Thomas Ward Bailey, Hammondsport, N. Y., assignor to Corning Glass Works, Corning, N. Y., a corporation of New York Application December 22, 1952, Serial No. 327,318

6 Claims. (Cl. 279—60)

The present invention relates to chuck assemblies particularly suitable for use in holding fragile linear glass bodies such as tubes and rods during their heating and working.

One object of the present invention is to provide a chuck assembly of very simple design which may if desired be loaded from the side rather than from the end thereof.

Another object is to provide a chuck assembly embodying the minimum amount of supporting structure surrounding the chuck jaws so as to enable an attendant to have a good view of that portion of an article within the confines of such jaws.

The foregoing objects are realized according to the invention by providing a structure wherein the major portion of the chuck jaw supporting and actuating assembly is laterally offset from the chuck jaws.

A preferred form of chuck assembly is illustrated in the accompanying drawing wherein Fig. 1 is an end elevation thereof, showing its jaws in seizing relation with a tubular article.

Fig. 2 is a sectional view taken generally on line 2—2 of Fig. 1.

Fig. 3 is a sectional view taken generally on line 3—3 of Fig. 2.

Fig. 4 is a front elevation, on an enlarged scale, of a detail of such assembly.

Referring to the drawing in detail the chuck assembly embodies a tubular support 11 anchored at one end to a suitable support, not shown. Support 11 has a reduced diameter portion 10 occupied by a tubular chuck jaw arm supporting slide 12, and a further reduced portion 31 near its other end occupied by a tubular chuck jaw supporting band or sleeve 13 held fixed with respect to support 11 by means of a nut 14 screw threaded on the end of support 11.

Arranged about the periphery of sleeve 13 at 120° intervals are chuck jaw supporting arms such as 15 each projecting beyond the end of support 11 along a path parallel thereto and having its free end slanting inward toward the support 11 and its axial center and provided with an adjoining cam groove 16. Each cam groove such as 16 forms a guide or way laterally interlocking but slidable with respect to a companion bordering portion of a chuck jaw such as 21.

In a similar fashion a tubular jaw supporting slide 12 arranged about portion 10 of support 11 is provided about its periphery at like 120° intervals with cylindrical apertures for receipt of cylindrical ends such as 18' of arms such as 18 extending adjacent arms 15 and terminating a distance therebeyond. The respective arms such as 18 are held fixed with respect to slide 12 by screws such as 28 and for the purpose of rigidity, are anchored to one another at their free ends by a ring 19. As with the arms such as 15 each arm 18 has an end bordering portion with a cam groove 20 having an outline similar to that of cam groove 16, but sloping in the reverse direction and laterally interlocked but slidable with respect to a companion bordering portion of the chuck jaw 21. A cover such as 22 is secured to each arm such as 18 by screws such as 23 to hold the chuck jaw 21 in its interlocking position with respect to the cam grooves 16 and 20 in arms 15 and 18. As will be appreciated, relative linear movement of the arms such as 15 and 18, is effective to move the chuck jaws such as 21 toward or away from one another into or out of seizing relation with an article such as the tube 40.

In the specific embodiment shown, relative longitudinal movement of slide 12 with respect to sleeve 13 is effected by an actuator shaft 24 that projects into the bore of support 11 and is secured to a piston 25 located within the portion 10 of support 11 surrounded by slide 12. A pin or element 26 passes through an elongated aperture 27 through the wall of the reduced diameter portion 10 of support 11 and into piston 25, thus anchoring it to the slide 12.

I claim:

1. In a chuck assembly, a linear support, a chuck jaw supporting arm associated with said support and projecting beyond an end thereof, a second chuck jaw supporting arm associated with said support also projecting beyond such end thereof, a chuck jaw having oppositely slanted portions slidably interlocked with companion portions of said arms respectively whereby lineal movement of one of said arms relative to the other effects movement of such chuck jaw along a path normal to such lineal movements, and means for effecting lineal movement of one of said arms relative to the other.

2. In a chuck assembly, a tubular support, a jaw supporting arm fixed at one end to said support and projecting beyond an end thereof, a chuck jaw arm supporting slide carried by and slidable along the length of said tubular support, a second jaw supporting arm attached to said slide and also projecting beyond such end of said support, a chuck jaw supported jointly by said arms and having oppositely disposed slanting grooved surfaces slidably interlocked with similar companion surfaces of said arms, and means for moving said slide along said support to effect movement of said jaw relative to said arms in a direction transverse to the axis of said support.

3. In a chuck assembly, a tubular support having an aperture through the wall thereof, a chuck jaw arm supporting slide surrounding such support and movable along the length thereof, an actuator for said slide arranged within said support and including an element passing through said aperture, a sleeve fixed to said support, arms carried by said slide and sleeve respectively having cam grooves therein, a jaw jointly supported by said arms having cam surfaces slidably cooperative with the cam grooves of said arms and relative to which the jaw is movable in response to any relative lineal movement between said slide and said support.

4. In a chuck assembly, a tubular support, a sleeve arranged about said support having a series of arms circumferentially spaced (at equal distances) from one another about said sleeve and having cam surfaces at their free ends, said arms extending parallel to the support and terminating beyond an end thereof, a slide surrounding said support having a second series of arms adjacent each of said first series of arms, each such second series of arms terminating at a point intermediate the end of said support and one of said first series of arms and each having a cam surface oppositely disposed with respect to the cam surfaces of said first arms, chuck jaws each having cam surfaces matching the cam surfaces of the associated first and second series of arms and slidably interlocked with the free ends thereof so that any longitudinal movement of the two series of arms relative to each other effects a transverse movement of said jaws with respect thereto, and means for effecting relative linear movement between said slide and said sleeve.

5. A chuck assembly such as defined by claim 1 wherein said last means comprises an actuator shaft arranged parallel to said support and available beyond the opposite end thereof for the purpose set forth.

6. A chuck assembly such as defined by claim 2 wherein said last means comprises an actuator shaft occupying the bore of said tubular support and available at the opposite end thereof for the purpose set forth.

References Cited in the file of this patent

UNITED STATES PATENTS

| | | |
|---|---|---|
| 1,011,975 | Lewis | Dec. 19, 1911 |
| 2,226,078 | Spahn | Dec. 24, 1940 |
| 2,501,758 | Cauchois | Mar. 28, 1950 |